United States Patent
Zhou et al.

(10) Patent No.: US 11,059,174 B2
(45) Date of Patent: Jul. 13, 2021

(54) SYSTEM AND METHOD OF CONTROLLING OBSTACLE AVOIDANCE OF ROBOT, ROBOT AND STORAGE MEDIUM

(71) Applicant: PING AN TECHNOLOGY (SHENZHEN) CO., LTD., Shenzhen (CN)

(72) Inventors: Taotao Zhou, Shenzhen (CN); Bao Zhou, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 447 days.

(21) Appl. No.: 16/084,231

(22) PCT Filed: Jun. 30, 2017

(86) PCT No.: PCT/CN2017/091368
§ 371 (c)(1),
(2) Date: Sep. 12, 2018

(87) PCT Pub. No.: WO2018/176668
PCT Pub. Date: Oct. 4, 2018

(65) Prior Publication Data
US 2021/0078173 A1    Mar. 18, 2021

(30) Foreign Application Priority Data
Mar. 27, 2017   (CN) .......................... 201710186581.6

(51) Int. Cl.
G06F 17/00     (2019.01)
B25J 9/16      (2006.01)
(Continued)

(52) U.S. Cl.
CPC ............. *B25J 9/1666* (2013.01); *B25J 9/163* (2013.01); *G05D 1/0238* (2013.01); *G06T 17/00* (2013.01); *G06T 2210/12* (2013.01)

(58) Field of Classification Search
CPC ......... B25J 9/1666; B25J 9/163; G06T 17/00; G06T 2210/12; G05D 1/0238
(Continued)

(56) References Cited

U.S. PATENT DOCUMENTS

| 7,734,387 B1 | 6/2010 | Young et al. |
| 2006/0208169 A1* | 9/2006 | Breed ................ G06K 9/00624 250/221 |

(Continued)

FOREIGN PATENT DOCUMENTS

| CN | 101512453 A | 8/2009 |
| CN | 106227218 A | 12/2016 |

(Continued)

OTHER PUBLICATIONS

Written Opinion of Singaporean Patent Application No. 11201809892Q dated Aug. 20, 2020.
(Continued)

*Primary Examiner* — Ronnie M Mancho

(57) ABSTRACT

A system and method of controlling obstacle avoidance of a robot. The method includes acquiring current positioning data of the robot, and determining whether an obstacle, spaced from a current position at a distance shorter than a preset distance, exists in a path from the current position to a target position or not according to the current positioning data and position data of all obstacles in a predetermined moving region; if the obstacle exists, calculating the shortest distance between the robot and the obstacle according to the acquired positioning data, a predetermined 3D model of the robot and a predetermined 3D model of the obstacle; cal-
(Continued)

culating a due movement direction of the current robot according to the acquired positioning data, the calculated shortest distance and the 3D model of the obstacle, and controlling a movement posture of the robot according to the calculated movement direction to avoid the obstacles.

19 Claims, 10 Drawing Sheets

(51) Int. Cl.
*G05D 1/02* (2020.01)
*G06T 17/00* (2006.01)

(58) Field of Classification Search
USPC .......................................................... 700/255
See application file for complete search history.

(56) References Cited

U.S. PATENT DOCUMENTS

| | | | | |
|---|---|---|---|---|
| 2013/0078149 | A1* | 3/2013 | Holmes | G01N 1/4077 422/72 |
| 2015/0202770 | A1* | 7/2015 | Patron | G06Q 20/386 700/245 |
| 2016/0111006 | A1 | 4/2016 | Srivastava et al. | |
| 2016/0288324 | A1 | 10/2016 | Bradski et al. | |
| 2017/0069214 | A1* | 3/2017 | Dupray | G08G 5/0013 |
| 2019/0056746 | A1 | 2/2019 | Jia et al. | |

FOREIGN PATENT DOCUMENTS

| | | |
|---|---|---|
| CN | 106406312 A | 2/2017 |
| EP | 1901150 A1 | 3/2008 |
| JP | H11250122 A | 9/1999 |
| JP | 2014018912 A | 2/2014 |
| JP | 2014056506 A | 3/2014 |
| KR | 20160054862 A | 5/2016 |
| TW | 201540281 A | 11/2015 |
| WO | 2008031664 A1 | 3/2008 |

OTHER PUBLICATIONS

Examination report of Australian Standard Patent Application No. 2017404562 dated Sep. 6, 2019.
Search report of European Patent Application No. 17897209.7 dated Oct. 8, 2019.
M. Greenspan et al., Obstacle Count Independent Real-Time Collision Avoidance, 1996 IEEE International Conference on Robotics and Automation, Apr. 1996, pp. 1073-1080, vol. 2, IEEE, Minneapolis, MN, USA.

* cited by examiner

SYSTEM AND METHOD OF CONTROLLING OBSTACLE AVOIDANCE OF ROBOT, ROBOT AND STORAGE MEDIUM

CROSS REFERENCE TO RELATED APPLICATIONS

This application is the national phase entry of international application PCT/CN2017/091368, filed on Jun. 30, 2017, which is based upon and claims priority to China Patent Application No. CN2017101865816, filed on Mar. 27, 2017 and entitled "System and Method of Controlling Obstacle Avoidance of Robot", which is hereby incorporated by reference in its entirety.

TECHNICAL FIELD

This disclosure relates generally to the technical field of computers, and more particularly relates to a system and method of controlling obstacle avoidance of a robot, a robot and a storage medium.

BACKGROUND

At the present, an independent moving robot can be widely applied to many scenes, for example guide work in an exhibition hall where the robot leads visitors and introduces exhibition areas from one to another, serving work in a restaurant where the robot takes the initiative to welcome customers and leads the customers to vacant seats for ordering, guide and patrolling work in public places where the robot moves along a programmed path and stops and answers questions if anyone needs help. In these cases, how to avoid the robot from colliding with an obstacle in an environment during moving is an important technical problem. At the present, the independent moving robot positions a location and avoids the obstacle via its own sensor, and a general industrial obstacle avoidance solution is that: a proximity sensor (such as an ultrasonic sensor, an infrared sensor and a laser sensor) is installed on the robot, and when detecting a certain distance (for example 10 cm) from the obstacle, the robot will avoid the obstacle.

The existing obstacle avoidance solution has the following shortcomings: I, the obstacle may be only detected at a height plane where the sensor is located; for a four-leg table, supposing that the sensor is placed at a height of 30 cm, but the tabletop is 60 cm high, the sensor may not detect the obstacle, and finally the robot collides with the tabletop; II, the obstacle may be only detected in a direction where the sensor is installed; and supposing that no sensor is installed on the back of the robot, the robot may collide with the obstacle when moving backwards.

Therefore, how to effectively control the obstacle avoidance of the robot under a condition that the sensor may not detect the obstacle all round has become a technical problem that urgently needs to be solved.

SUMMARY

The disclosure mainly aims to provide a system and method of controlling obstacle avoidance of a robot, a robot and a storage medium, and aims at effectively controlling the robot to avoid obstacles.

To achieve the above objective, on the first aspect of the application, a system of controlling obstacle avoidance of a robot is provided. The system of controlling the obstacle avoidance of the robot includes:

a determination module, which is used for acquiring current positioning data of the robot in real time or regularly, and determining whether an obstacle, which is spaced from a current position at a distance shorter than a preset distance, exists in a path from the current position to a target position according to the current positioning data and position data of all obstacles in a predetermined moving region;

a calculation module, which is used for calculating the shortest distance between the robot and the obstacle according to the acquired positioning data, a predetermined 3D model of the robot and a predetermined 3D model of the obstacle if the obstacle, which is spaced from the current position at the distance shorter than the preset distance, exists;

a control module, which is used for calculating a due movement direction of the current robot according to the acquired positioning data, the calculated shortest distance and the 3D model of the obstacle, and controlling a movement posture of the robot according to the calculated movement direction to avoid the obstacle.

On the second aspect of the application, a method of obstacle avoidance of a robot is provided. The method includes:

A1. acquiring current positioning data of the robot in real time or regularly, and determining whether an obstacle, which is spaced from a current position at a distance shorter than a preset distance, exists in a path from the current position to a target position according to the current positioning data and position data of all obstacles in a predetermined moving region;

A2. if the obstacle, which is spaced from the current position at the distance shorter than the preset distance, exists, calculating the shortest distance between the robot and the obstacle according to the acquired positioning data, a predetermined 3D model of the robot and a predetermined 3D model of the obstacle;

A3. calculating a due movement direction of the current robot according to the acquired positioning data, the calculated shortest distance and the 3D model of the obstacle, and controlling a movement posture of the robot according to the calculated movement direction to avoid the obstacle.

On the third aspect of the application, a robot is provided, including a processor and a memory. The memory stores a system of controlling obstacle avoidance of the robot. The system of controlling obstacle avoidance of the robot may be executed by the processor to implement the following steps:

A1. acquiring current positioning data of the robot in real time or regularly, and determining whether an obstacle, which is spaced from a current position at a distance shorter than a preset distance, exists in a path from the current position to a target position according to the current positioning data and position data of all obstacles in a predetermined moving region;

A2. if the obstacle, which is spaced from the current position at the distance shorter than the preset distance, exists, calculating the shortest distance between the robot and the obstacle according to the acquired positioning data, a predetermined 3D model of the robot and a predetermined 3D model of the obstacle;

A3. calculating a due movement direction of the current robot according to the acquired positioning data, the calculated shortest distance and the 3D model of the obstacle, and controlling a movement posture of the robot according to the calculated movement direction to avoid the obstacle.

On the fourth aspect of the application, a computer readable storage medium is provided, which stores a system of controlling obstacle avoidance of a robot. The system of controlling obstacle avoidance of the robot may be executed by at least one processor to implement the following steps:

A1. acquiring current positioning data of the robot in real time or regularly, and determining whether an obstacle, which is spaced from a current position at a distance shorter than a preset distance, exists in a path from the current position to a target position according to the current positioning data and position data of all obstacles in a predetermined moving region;

A2. if the obstacle, which is spaced from the current position at the distance shorter than the preset distance, exists, calculating the shortest distance between the robot and the obstacle according to the acquired positioning data, a predetermined 3D model of the robot and a predetermined 3D model of the obstacle;

A3. calculating a due movement direction of the current robot according to the acquired positioning data, the calculated shortest distance and the 3D model of the obstacle, and controlling a movement posture of the robot according to the calculated movement direction to avoid the obstacle.

According to the system and method of controlling obstacle avoidance of the robot, the robot and the storage medium, which are provided by the disclosure, when detection, carried out according to the current positioning data of the robot, finds that there is the obstacle spaced from the current position at the distance shorter than the preset distance, the shortest distance between the robot and the obstacle in a three-dimensional space is calculated according to the current positioning data of the robot, the predetermined 3D model of the robot and the predetermined 3D model of the obstacle, and the due movement direction of the current robot is also calculated, so that the movement posture of the robot may be controlled. The movement direction of the robot may be controlled via the shortest distance between the robot and the obstacle in the three-dimensional space, thus realizing detection and avoidance of obstacles in all directions of the robot in the three-dimensional space, and effectively controlling the robot to avoid the obstacles.

Objectives, functional features, and advantages of this disclosure will be described below in further detail in connection with embodiments and the accompanying drawings.

DETAILED DESCRIPTION OF THE EMBODIMENTS

To make technical problems to be solved, technical solutions and beneficial effects of this disclosure clearer and more understandable, a further detailed description will be made to the disclosure in combination with the accompanying drawings and embodiments. It should be understood that the specific embodiments described herein are merely illustrative of the disclosure, but not intended to limit the disclosure.

A method of obstacle avoidance of a robot is provided.

Figure 1:
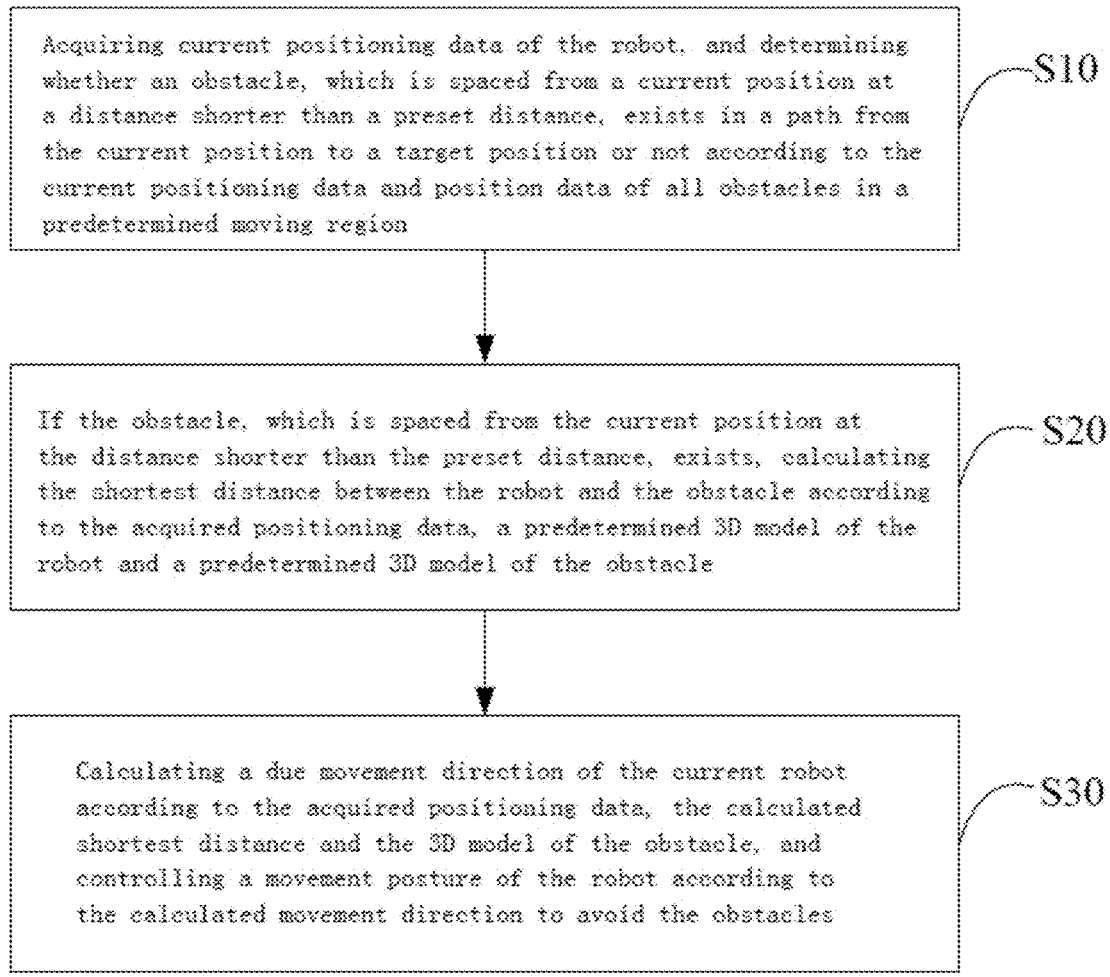
FIG. 1 is a flowchart of one embodiment of a method of obstacle avoidance of a robot of the disclosure.

With reference to FIG. 1, FIG. 1 is a flowchart of one embodiment of a method of obstacle avoidance of a robot of the disclosure.

In one embodiment, the method of obstacle avoidance of the robot includes:

Step S10, a system of controlling obstacle avoidance of the robot acquires current positioning data (for example an indoor position, a posture and the like) of the robot in real time or regularly (for example every 2 seconds), and determines whether an obstacle, which is spaced from a current position at a distance shorter than a preset distance, exists in a path from the current position to a target position or not according to the current positioning data and position data of all obstacles in a predetermined moving region. For example, distances from all the obstacles in the predetermined moving region may be positioned and judged via an own sensor of the robot. For example, a proximity sensor (such as an ultrasonic sensor, an infrared sensor and a laser sensor) may be installed on the robot to judge whether the obstacle, which is spaced from the current position at the distance shorter than the preset distance, exists in the path from the current position of the robot to the target position or not.

Step S20, if the obstacle, which is spaced from the current position at the distance shorter than the preset distance, exists, the shortest distance between the robot and the obstacle is calculated according to the acquired positioning data, a predetermined 3D model of the robot and a predetermined 3D model of the obstacle.

After the distances between the current position of the robot and all the obstacles in the predetermined moving region are detected, but if no obstacle, which is spaced from the current position at the distance shorter than the preset distance, exists, the robot goes on moving along the path to the target position, and distances between the robot and all the obstacles in the moving region are detected in real time or regularly. If the obstacle, which is spaced from the current position at the distance shorter than the preset distance, exists, the shortest distance between the robot and the obstacle is calculated according to the acquired positioning data, the predetermined 3D model of the robot and the predetermined 3D model of the obstacle to judge whether the robot in a three-dimensional space may collide with the obstacle or not during moving along the path to the target position by using the shortest distance, thereby realizing that an obstacle may be detected at a height plane where the sensor of the robot is located, and a potential obstacle in the three-dimensional space may be also detected, that is, the potential obstacles in all directions in the three-dimensional space may be all detected in a direction where the sensor is installed on the robot and in other directions where no sensors are installed on the robot, wherein the predetermined 3D model of the robot and the 3D models of all the obstacles in the moving region may be pre-stored in a storage unit of the robot, or may be obtained by the robot which accesses an Internet of things system server through a wireless communication unit, and no limitation will be made here.

Step S30, a due movement direction of the current robot is calculated according to the acquired positioning data, the calculated shortest distance and the 3D model of the obstacle, and a movement posture of the robot is controlled according to the calculated movement direction to avoid the potential obstacles in all directions in the three-dimensional space, thus effectively controlling the robot to avoid the obstacles during moving along the path to the target position.

In this embodiment, when detection, carried out according to the current positioning data of the robot, finds that there is the obstacle spaced from the current position at the distance shorter than the preset distance, the shortest distance between the robot and the obstacle in the three-dimensional space is calculated according to the current positioning data of the robot, the predetermined 3D model of the robot and the predetermined 3D model of the obstacle, and the due movement direction of the current robot is also calculated, so that the movement posture of the robot may be controlled. The movement direction of the robot may be controlled via the shortest distance between the robot and the obstacle in the three-dimensional space, thus realizing detection and avoidance of obstacles in all directions of the robot in the three-dimensional space, and effectively controlling the robot to avoid the obstacles.

Further, the step S20 includes:

Step S201, the predetermined 3D model of the robot and the 3D model of the obstacle are preprocessed.

Step S202, the shortest distance between the robot and the obstacle is calculated by using a predetermined distance calculation rule according to the acquired positioning data, preprocessed 3D model data of the robot and preprocessed 3D model data of the obstacle.

For example, as the robot and the obstacle are generally non-convex bodies, the 3D models of the robot and the obstacle may be preprocessed, for example they may be converted into convex bodies so as to calculate the shortest distance more accurately and quickly in the subsequent step.

Further, the preprocessing of the 3D model of the robot in the step S201 includes: for each joint of the robot, a minimum convex polyhedron surrounding each joint is found out by directly using a predetermined algorithm (for example a QuickHull algorithm) to convert the robot non-convex model into a convex model. By the 3D model of the robot subjected to convex processing, the calculation speed and the calculation precision may be effectively improved during subsequent calculation of a shortest distance vector.

There are three modes for preprocessing the 3D model of the obstacle: the first one is that a convex bounding box of a non-convex polyhedron is built, and then is converted into a convex body for collision detection; the second one is that the non-convex polyhedron is subjected to convex decomposition to convert the non-convex model into a plurality of convex bodies for collision detection; and the third one is that the 3D model of the obstacle is subjected to sector equal division (namely sector subdivision), and then single sectors subjected to the equal division are subjected to convex decomposition. The third mode of sector equal division first and then convex decomposition is higher in calculation speed and higher in calculation precision than the first two modes.

Further, the step that the 3D model of the obstacle is subjected to sector equal division includes:

a spherical bounding box of the 3D model of the obstacle to be subjected to sector equal division is built, and the sphere center of the spherical bounding box is found out;

an initial sector equal division plane passing through the sphere center is set, and then is rotated for multiple times around the sphere center according to a preset rotating angle to equally divide the spherical bounding box into n sector portions, wherein the n sector portions of the spherical bounding box serve as n model portions of the 3D model of the obstacle.

For example, in one specific implementation mode, the step may include the following steps:

X1, a spherical bounding box B of the 3D model of the obstacle M to be subjected to sector equal division is built, a sphere center O of the spherical bounding box B is found out, and a three-dimensional coordinate system Oxyz is built at the sphere center O;

X2, a straight line L, which is overlapped with the axis z in the three-dimensional coordinate system Oxyz, is made in a manner of passing through the sphere center O, so that the plane xoz is an initial sector equal division plane, and the plane xoz is set as $\alpha_1$ which divides the 3D model of the obstacle into 2 portions;

X3, $\alpha_1$ is rotated at a certain angle β (which represents an adjacent sector deflection angle) around the straight line L to obtain another new plane $\alpha_2$, the new plane is continuously rotated by β to obtain a plane $\alpha_3$, and when the plane is rotated by (m−1) times, an mth plane $\alpha_m$ may be obtained;

X4, supposing β=180/m, the m planes may equally divide the spherical bounding box B into 2 m portions, so that the 3D model of the obstacle is divided into 2 m model portions. By the above-mentioned steps, simple division of any model may be completed, including simple division of the non-convex model, and the divided model portions may be managed according to a hash table.

Further, the step that the single sectors subjected to equal division are subjected to convex decomposition includes:

the 3D model of the obstacle is subjected to surface triangulation by adopting a Delaunay triangulation algorithm to generate a triangular patch (lug) set, and a convex block corresponding to each triangular patch is constructed for each triangular patch. For example, the triangular patches with zero thickness are stretched on the basis of a preset thickness in directions of their plane normal vectors, and then are changed into convex blocks.

Further, the predetermined distance calculation rule includes:

all the model portions obtained by the sector equal division of the 3D model of the obstacle are selected according to the current positioning data (such as the indoor position and the posture) of the robot and a predetermined selection algorithm to select a model portion to be subjected to distance calculation;

the shortest distance between the robot and the selected model portion is calculated by using a predetermined distance calculation algorithm (for example a GJK algorithm) according to the acquired positioning data and the selected model portion, wherein the shortest distance is the shortest distance between the robot and the 3D model of the obstacle.

Figure 2A:
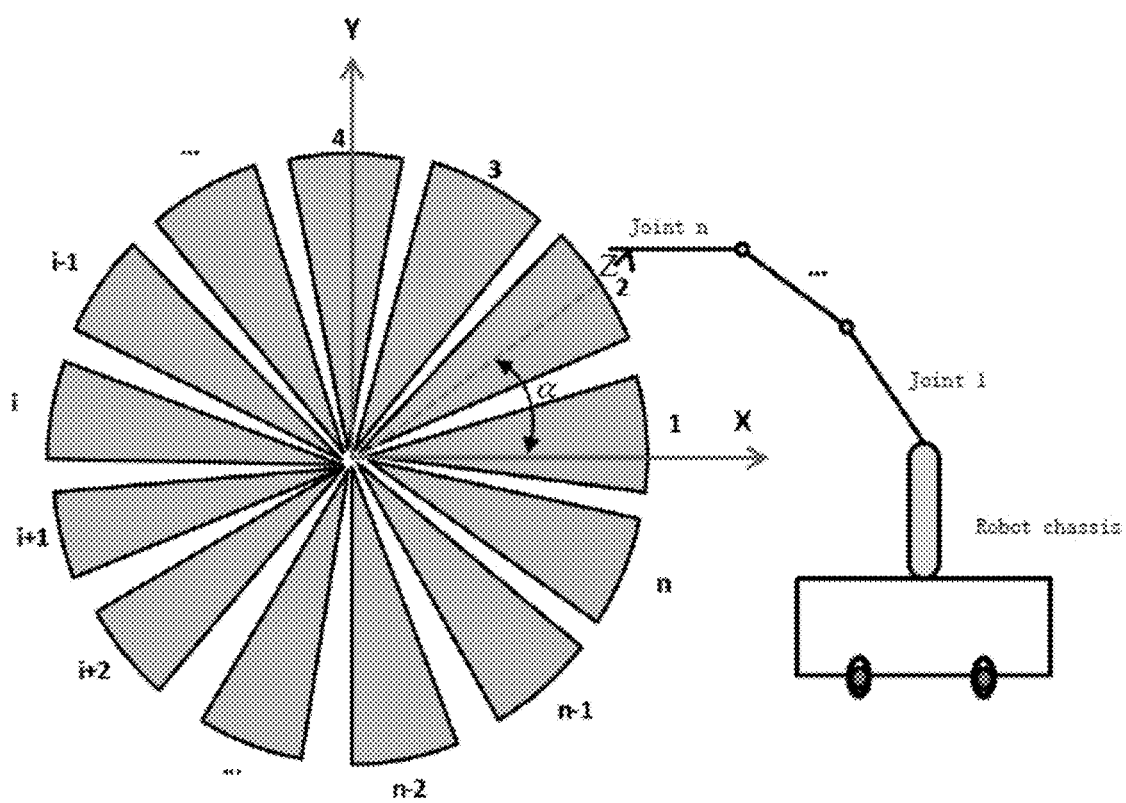
FIG. 2A is a schematic diagram of sector equal division of a 3D model of an obstacle in one embodiment of a method of obstacle avoidance of a robot of the disclosure.
Figure 2B:
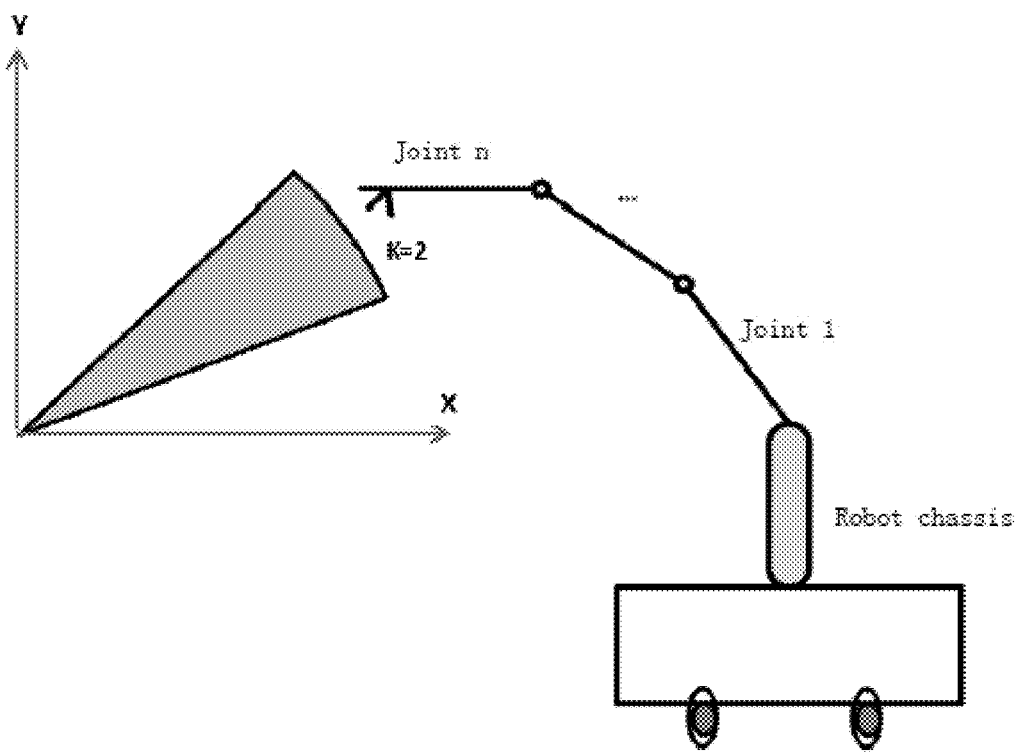
FIG. 2B is a schematic diagram of a sector model portion No. k in one embodiment of a method of obstacle avoidance of a robot of the disclosure.

Further, as shown in FIG. 2A and FIG. 2B, FIG. 2A is a schematic diagram of sector equal division of a 3D model of an obstacle in one embodiment of a method of obstacle avoidance of a robot of the disclosure, and FIG. 2B is a schematic diagram of a sector model portion No. k in one embodiment of a method of obstacle avoidance of a robot of the disclosure. The predetermined selection algorithm includes:

Y1, the n model portions obtained by the sector equal division of the 3D model of the obstacle respectively serve as n nodes of the obstacle, and a hash table, in which key-values respectively correspond to rotating angles, namely the deflection angles, relative to the initial sector equal division plane (namely the plane xoz) and model geometrical information data, is built to carry out model node management;

Y2, all the model portions obtained by sector equal division are numbered, starting from 1; for the equally divided n sector model portions, an adjacent sector deflection angle is 360°/n; according to the numbers, a deflection angle mapping relation of a sector model portion at initial No. i is built; and a hash function representing the deflection angle mapping relation is:

$$\text{Hash}(i)=i*(360°/n)$$

where i represents the sector model portion No. i, and Hash(i) represents a deflection angle between the sector model portion No. i and the positive axis of axis X of an obstacle coordinate system;

Y3, kinematics of the robot is built, positions and postures of all the joints of the robot are calculated according to the built kinematics, and an obstacle sector region near to the robot is inquired in the built hash table. As shown in FIG. 2 below, during moving of the robot, according to the kinematics of the robot, the kinematical equation is as follows:

$$T_i = A_0 A_1 A_2 \ldots A_{i-1} A_i$$

where $A_k$ (k=1, 2, . . . , i) is a homogeneous transformation matrix (which may be determined according to D-H parameters of all the joints of the robot) among joint coordinate systems of the robot, $A_0$ represents the current position matrix (which corresponds to the current positioning data of the robot) of the robot, and $T_i$ represents the position and the posture of the ith joint relative to a robot coordinate system; real-time update values $Q_i$ (x, y, z) of origin coordinates of local coordinate systems of all the joints during moving of the robot are calculated according to $T_i$, and a deflection angle α of each joint under the obstacle coordinate system may be further obtained:

$$\alpha = f(Q_i(x, y, z))$$

where $Q_i$ (x, y, z) represents coordinates of each robot joint under the robot coordinate system; $T_r$ represents a transformation matrix (which is a 4*4 matrix, and if the robot coordinate system and the obstacle coordinate system have been confirmed, this matrix may be directly calculated) for transforming the robot coordinate system to the obstacle coordinate system, and coordinates $Q_i$ ($x_t$, $y_t$, $z_t$) of each robot joint under the obstacle coordinate system is as follows:

$$Q_i(x_t, y_t, z_t) = T_r Q_i(x, y, z)$$

supposing that the axis Z of the obstacle coordinate system is positively upward, the deflection angle of each joint under the obstacle coordinate system is set as α by abiding by a right-handed coordinate system, then $$\tan(\alpha) = \frac{y_t}{x_t}$$

this trigonometric function is solved to obtain the deflection angle α of each joint under the obstacle coordinate system; after the deflection angle α is obtained, correspondingly numbered sector model portions may be calculated according to the hash function Hash(i) representing the deflection angle mapping relation, and the model portions to be subjected to the distance calculation are selected on the basis of the correspondingly numbered model portions. For example, if the number of the calculated sector model portion is k, sector model portions with numbers within a range of [k−M, k+N] may be selected for shortest distance calculation, wherein M and N are preset values; and the multiple sector model portions near to the selected sector model portion No. k serve as the model portions for shortest distance calculation.

Figure 3A:
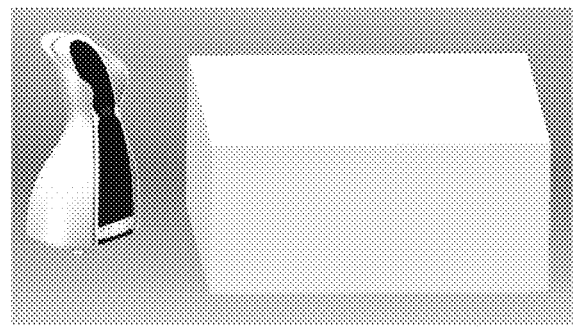
FIG. 3A is a schematic diagram of 3D models of a robot and an obstacle in one embodiment of a method of obstacle avoidance of a robot of the disclosure.

As shown in FIG. 3A, which is a schematic diagram of 3D models of a robot and an obstacle in one embodiment of a method of obstacle avoidance of a robot of the disclosure, in one specific implementation mode, the robot does not have arms and other movement joints, but only has a chassis movement; the 3D model of the robot is 1,500 mm in height and has a movement chassis radius of 320 mm, and the 3D model of the obstacle is a simple cubic model with the size of 2,200 mm*2,200 mm*1,000 mm; and under the obstacle model coordinate system, the current coordinates of the robot are (1800, −100).

Figure 3B:
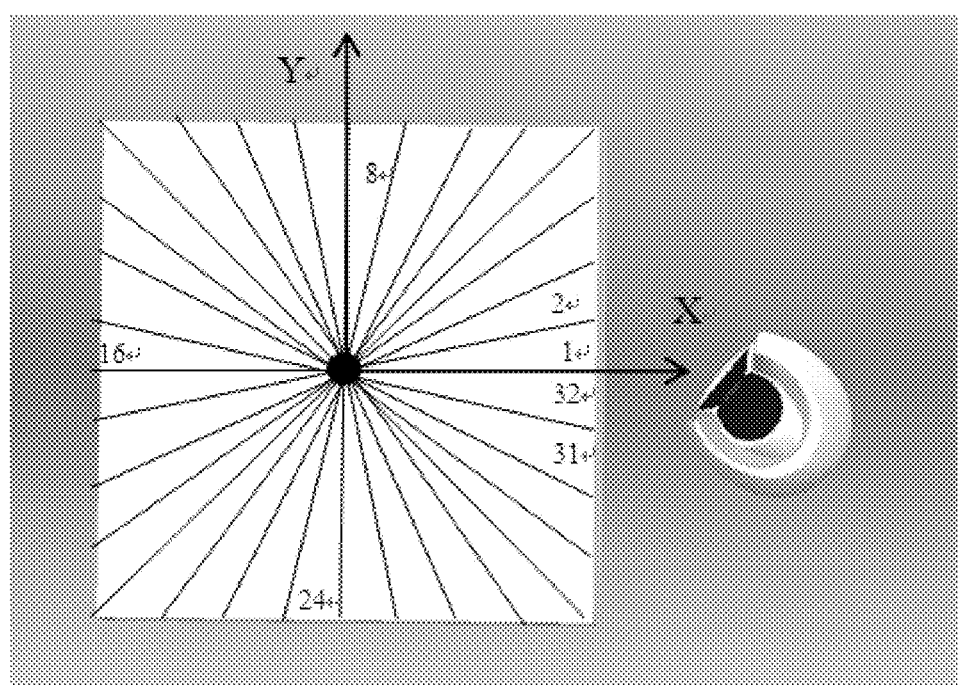
FIG. 3B is a schematic diagram of sector equal division of a cubic obstacle model in one embodiment of a method of obstacle avoidance of a robot of the disclosure.

FIG. 3B is a schematic diagram of sector equal division of a cubic obstacle model in one embodiment of a method of obstacle avoidance of a robot of the disclosure. During preprocessing of the obstacle model, the preprocessing is mainly to carry out sector equal division on the obstacle model; as shown in FIG. 3B, the obstacle model is subjected to the sector equal division into 32 portions, and the model portions obtained by the sector equal division are anticlockwise numbered as 1, 2, . . . , 15, 16, . . . , 31, 32 from the axis X; an included angle of each model block is 360/32=11.25 degrees. It can be seen that the model block No. 1 has a deflection angle of 11.25 degrees from the positive direction of the axis X, the model block No. 2 has a deflection angle of 11.25*2=22.5 degrees from the positive direction of the axis X, and the model block No. i has a deflection angle of i*(360/32) degrees from the positive direction of the axis X.

Figure 3C:
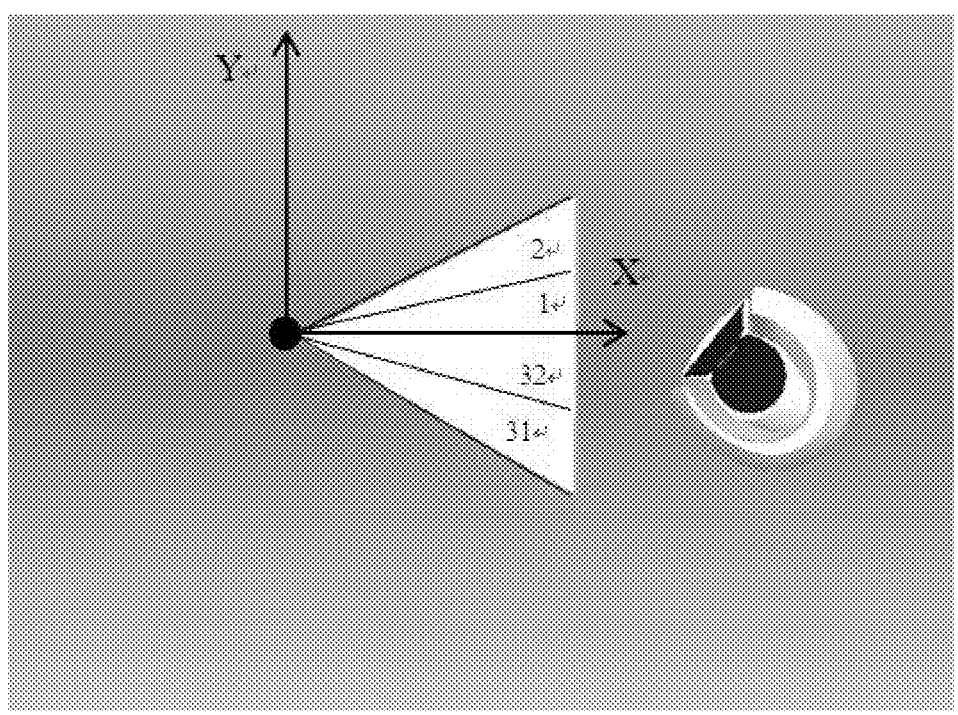
FIG. 3C is a schematic diagram of selection of a model portion in one embodiment of a method of obstacle avoidance of a robot of the disclosure.

FIG. 3C is a schematic diagram of selection of a model portion in one embodiment of a method of obstacle avoidance of a robot of the disclosure. During selection of the model portions, as the robot adopted in this embodiment does not have the arm and other movement joints, but only has the chassis movement, a position and a posture of a chassis represent the overall position and posture of the robot; when the current position of the robot is at (1800, −100) (coordinates under the obstacle coordinate system), the deflection angle between the robot and the positive axis of the axis X of the obstacle coordinate system may be calculated as 354 degrees, and then the number of the sector model portion corresponding to the robot is calculated as 354/11.25=31.5 which is rounded up to an integer, thus obtaining 32, so that the number of the corresponding sector block to be subjected to distance calculation is 32, that is, the robot is closest to the obstacle block No. 32. Next, by selection of the obstacle blocks near to K=32, the shortest distance between the obstacle block and the robot and shortest distance points are calculated by adopting GJK; if M=1, and N=2, the range from 31 to 34 for the obstacle blocks is obtained; those having the numbers larger than 32 need to be subjected to simple transformation: the obstacle block No. 33 is transformed into a corresponding obstacle block No. 1, and the obstacle block No. 34 is transformed into a corresponding obstacle block No. 2; and as shown in FIG. 3C, the obstacle blocks NO. 31, 32, 1 and 2 are finally selected for shortest distance calculation.

Figure 3D:
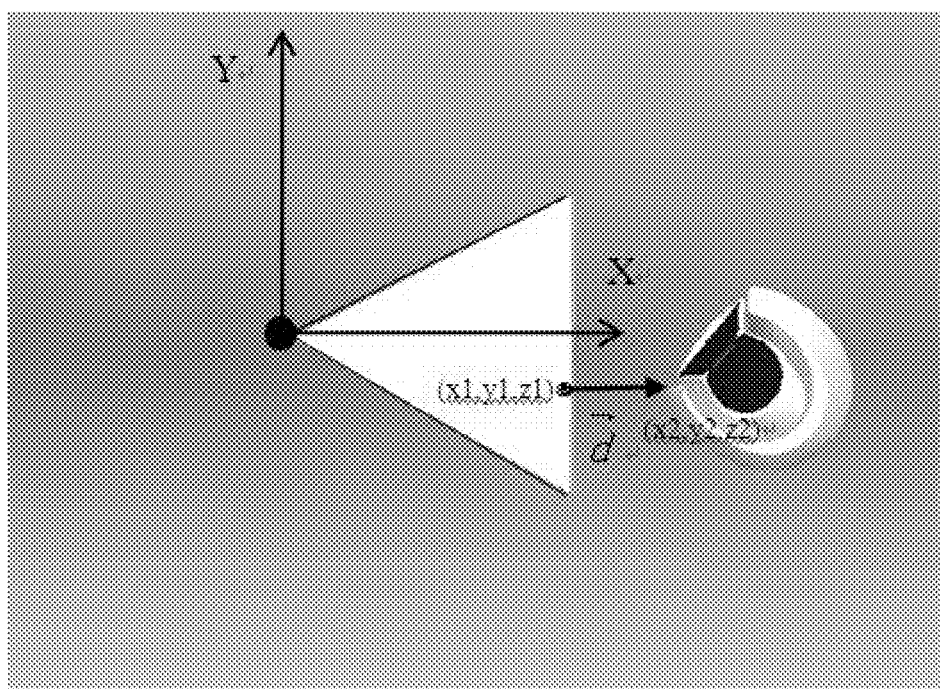
FIG. 3D is a schematic diagram of calculation of a shortest distance vector in one embodiment of a method of obstacle avoidance of a robot of the disclosure.

FIG. 3D is a schematic diagram of calculation of a shortest distance vector in one embodiment of a method of obstacle avoidance of a robot of the disclosure. During the calculation of the shortest distance, by virtue of the above processing, the range of the obstacle blocks has been narrowed as (1,2,31,32), so that the shortest distance points between the robot and the obstacle may be directly calculated by adopting the GJK algorithm; as shown in FIG. 3D, and are respectively a point (x1, y1, z1)=(1100, −100, −235) on the obstacle, and a point (x2, y2, z2)=(1477, −100, −235) on the robot; and the shortest distance vector between the robot and the obstacle is $\vec{d}$=(x2−x1, y2−y1, z2−z1)=(377, 0,0).

Further, the step S30 includes:

the system of controlling obstacle avoidance of the robot analyzes whether to avoid the obstacle or not according to the calculated shortest distance; if the calculated shortest distance is greater than a preset distance threshold value, the system determines that no obstacle avoidance is needed, or if the calculated shortest distance is less than or equal to the preset distance threshold value, the system determines that obstacle avoidance is needed. If the obstacle avoidance is needed, the system of controlling obstacle avoidance of the robot calculates the due movement direction of the current robot according to the acquired positioning data, the calculated shortest distance and the 3D model of the obstacle, and controls the movement posture of the robot according to the calculated movement direction.

Further, the step that the system calculates the due movement direction of the current robot according to the acquired positioning data, the calculated shortest distance and the 3D model of the obstacle includes:

the robot and the obstacle are projected into the same coordinate system plane;

an area of an effective blocking region of a projection of the obstacle relative to the current position of the robot and the target position is calculated according to a predetermined projection analysis rule and coordinates of all points on the outer contour of a projection region obtained by projecting the 3D model of the obstacle to the coordinate system plane;

a first preset type of obstacle avoidance parameter (such as virtual repulsive force) is determined according to the calculated shortest distance and the area of the effective blocking region, a second preset type of obstacle avoidance parameter (such as virtual attractive force) is determined according to a distance between the target point position and the current position of the robot, and the current due movement direction of the robot is determined according to the first preset type of obstacle avoidance parameter and the second preset type of obstacle avoidance parameter.

Figure 4:
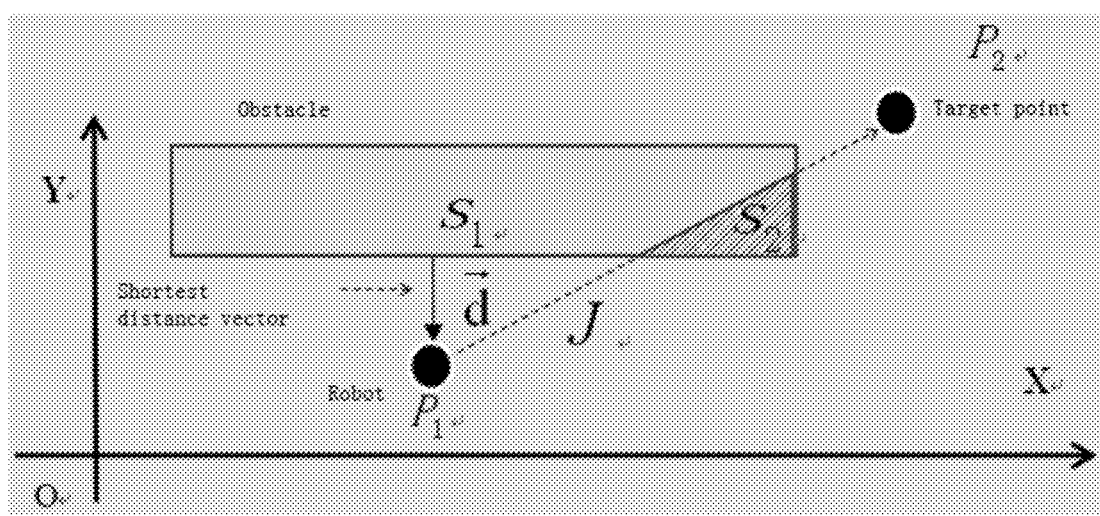
FIG. 4 is a schematic diagram of determination of an effective blocking region in one embodiment of a method of obstacle avoidance of a robot of the disclosure.

Further, as shown in FIG. 4, FIG. 4 is a schematic diagram of determination of an effective blocking region in one embodiment of a method of obstacle avoidance of a robot of the disclosure. The predetermined projection analysis rule is as follows:

a position point $P_1$ on the coordinate system plane is set to represent a position where the robot is located, namely the current position, a position point $P_2$ is set to represent a position where a target point is located, namely the target position, a projection region P3 represents a projection of the 3D model of the obstacle in the coordinate system plane, and $P_1$ and $P_2$ are connected in the coordinate system plane to obtain a straight line J;

if the straight line J and the projection region P3 do not have an intersection or only have one intersection, it determines that no effective blocking region exists;

if the straight line J and the projection region P3 have more than one intersection, the straight line J partitions the projection into two portions (a region $S_1$ and a region $S_2$ as shown in FIG. 4); any point $P_s$ is found in the projection region P3 (for example in the region $S_1$ or $S_2$), a perpendicular line of the straight line J is made in a manner of passing through $P_s$, and an intersection between the perpendicular line and the straight line J is $P_J$, thus obtaining a vector $\overrightarrow{P_J P_S}$=$P_J$−$P_S$; an included angle θ between the vector $\vec{d}$ of the shortest distance and the vector $\overrightarrow{P_J P_S}$=$P_J$−$P_S$ is calculated; if θ is an acute angle, it determines that the region where the point $P_s$ is located is the effective blocking region (for example, the effective blocking projection region $S_2$ in FIG. 4), or if θ is not an acute angle, it determines that the region where the point $P_s$ is located is not the effective blocking region.

Further, the first preset type of obstacle avoidance parameter is the virtual repulsive force, and the second preset type of obstacle avoidance parameter is the virtual attractive force. The step that the first preset type of obstacle avoidance parameter is determined according to the calculated shortest distance and the area of the effective blocking region, the second preset type of obstacle avoidance parameter is determined according to the distance between the target position and the current position of the robot, and the current due movement direction of the robot is determined according to the first preset type of obstacle avoidance parameter and the second preset type of obstacle avoidance parameter includes:

one virtual repulsive force acting on the robot is calculated by using a first calculation rule according to the calculated shortest distance and the area of the effective blocking projection region;

one virtual attractive force acting on the robot is calculated by using a second calculation rule according to the distance between the current position and the target point position;

a resultant force direction of the virtual attractive force and the virtual repulsive force is calculated, wherein the resultant force direction is the current due movement direction of the robot.

Further, the first calculation rule is as follows:

$$\vec{F}_r = f(\vec{d}, S)$$

where $\vec{d}$ is the vector of the shortest distance between the robot and the obstacle, S is the area of the effective blocking region, $\vec{F}_r$ is the virtual repulsive force from the obstacle to the robot, and f($\vec{d}$, S) represents a relational expression that the shortest distance vector and the area of the effective blocking region are converted into the virtual repulsive force from the obstacle to the robot. There are many ways for implementing the relational expression. In one optional embodiment, this relational expression is as follows:

$$F_r = f(d, s) = \begin{cases} 0 & d > d_0 \\ \dfrac{k_r}{d} + b_r & d \le d_0, s \le s_0 \\ \dfrac{k_r}{d} * \dfrac{s}{s_0} + b_r & d \le d_0, s > s_0 \end{cases}$$

where $k_r$ and $b_r$ represents preset virtual repulsive force coefficients, $s_0$ larger than 0 represents a preset area threshold value of the effective blocking region, and $d_0$ larger than 0 represents a preset distance threshold value; and the direction of the virtual repulsive force (namely the $\vec{F}_r$ direction) is the same as that of the shortest distance.

According to the relational expression, when the robot is farther to the obstacle, and the shortest distance is greater than the set distance threshold value $d_0$, no obstacle avoidance is needed, and $\vec{F}_r$ is 0; when the robot enters an obstacle avoidance distance range (namely the shortest distance is less than $d_0$), and the area s of the effective blocking region exceeds the set value $s_0$, $s/s_0$ is larger than 1, which would enlarge $\vec{F}_r$, so that the obstacle avoidance may be carried out at a farther distance, and the robot avoids the obstacle in advance to avoid relatively large obstacles. Further, the second calculation rule is as follows:

$$F_t = k_t * d_t$$

where $\vec{F}_t$ is the virtual attractive force from the target position to the robot, $k_t$ represents a preset attractive force coefficient, $d_t$ represents a distance between the target position and the current position of the robot, and the direction of the virtual attractive force (namely the $\vec{F}_t$ direction) faces to the target position.

A system of controlling obstacle avoidance of a robot is further provided.

Figure 5:
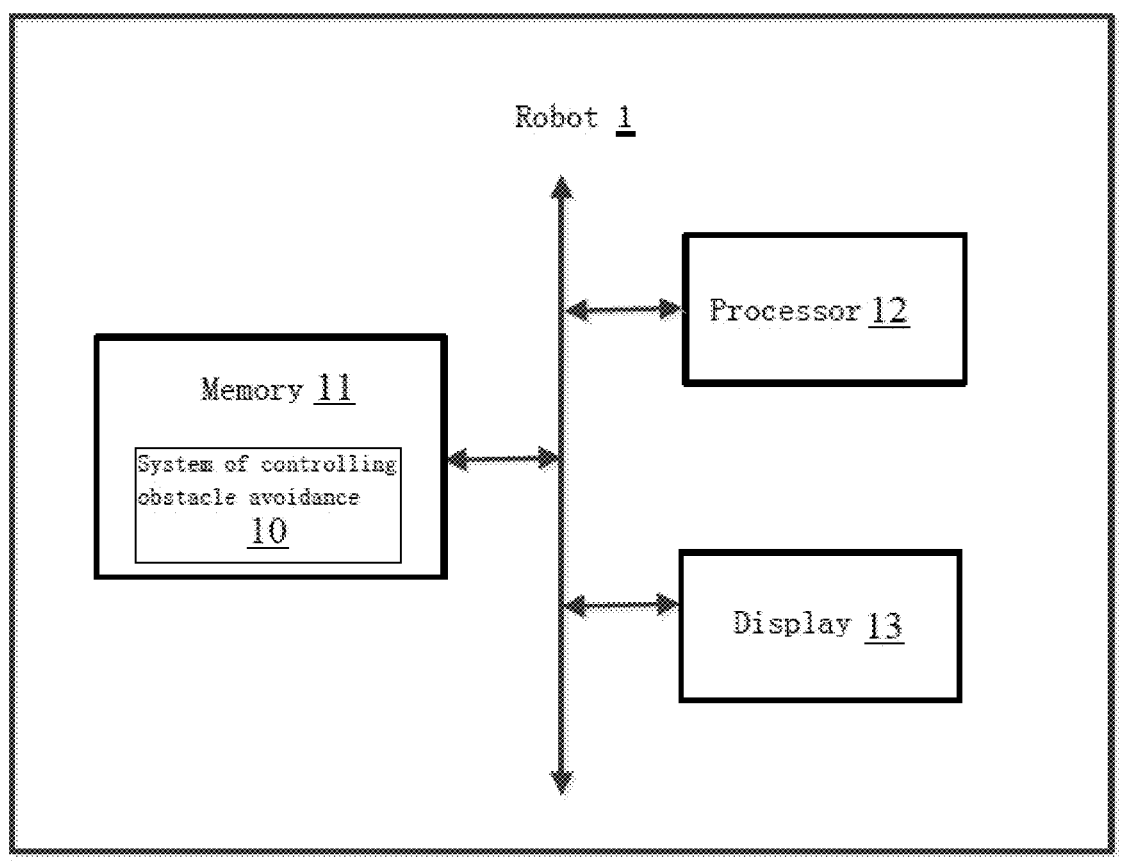
FIG. 5 is a schematic diagram of an operation environment of a preferred embodiment of a system 10 of controlling obstacle avoidance of the disclosure.

With reference to FIG. 5, this figure shows a schematic diagram of an operation environment of a preferred embodiment of a system 10 of controlling obstacle avoidance of the disclosure.

In this embodiment, the system 10 of controlling obstacle avoidance is installed and operated in the robot 1.

The robot 1 may include, but not limited to, a memory 11, a processor 12 and a display 13. FIG. 1 shows the robot 1 having assemblies from 11 to 13, but it should be understood that not all the assemblies listed are required to be implemented, and more or fewer assemblies may be implemented instead.

The memory 11 includes an internal memory and at least one type of readable storage medium. The internal memory provides a buffer for operation of the robot 1; the readable storage medium may be a non-volatile storage medium, such as a flash memory, a hard disk, a multimedia card and a card memory. In some embodiments, the readable storage medium may be an internal storage unit of the robot 1, for example the hard disk or the internal memory of the robot 1. In some other embodiments, the readable storage medium also may be external storage equipment of the robot 1, for example a plug-in type hard disk, a Smart Media Card (SMC), a Secure Digital (SD) card, a Flash Card (FC) and the like which are equipped on the robot. In this embodiment, the readable storage medium of the memory 11 is generally used for storing application software installed in the robot 1 and all types of data, for example a program code of the system 10 of controlling obstacle avoidance and the like. The memory 11 may be also used for temporarily storing data which have been output or are about to be output.

In some embodiments, the processor 12 may be a Central Processing Unit (CPU), a micro processor or other data processing chips, and is used for operating the program code stored in the memory 11 or processing the data. The processor 12 executes the system 10 of controlling obstacle avoidance to implement any step of the method of obstacle avoidance of the robot.

In some embodiments, the display 13 may be an Light-Emitting Diode (LED) display, a liquid crystal display, a touch liquid crystal display, an Organic Light-Emitting Diode (OLED) touch device and the like. The display 13 is used for displaying information processed in the robot 1 and displaying a visual user interface such as an application menu interface and an application icon interface. The assemblies 11 to 13 of the robot 1 communicate with one another through a system bus.

Figure 6:
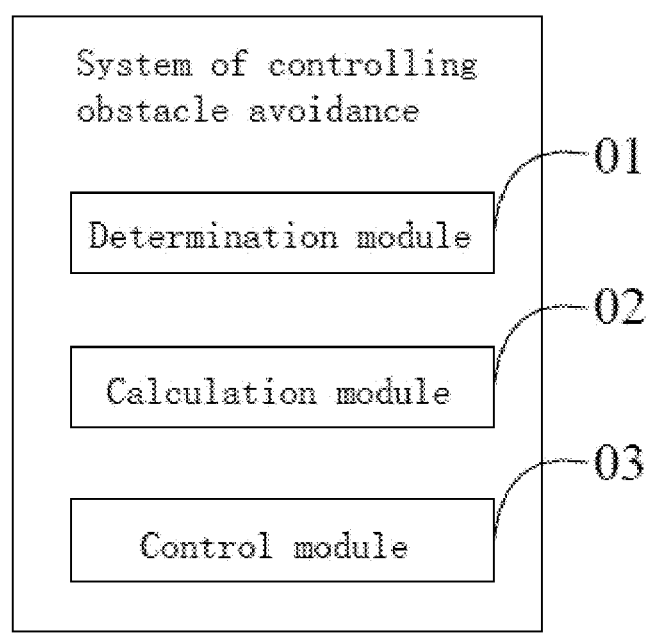
FIG. 6 is a functional module diagram of a preferred embodiment of a system 10 of controlling obstacle avoidance of the disclosure.

With reference to FIG. 6, showing a functional module diagram of a preferred embodiment of a system 10 of controlling obstacle avoidance, in this embodiment, the system 10 of controlling obstacle avoidance may be partitioned into a determination module 01, a calculation module 02 and a control module 03. The modules in the disclosure are a series of computer program instruction segments capable of completing specific functions, and are used for describing execution processes of the system 10 of controlling obstacle avoidance in the robot 1. When the processor 12 executes the computer program instruction segments of all the modules of the system 10 of controlling obstacle avoidance, any step of the above-mentioned method of obstacle avoidance of the robot may be implemented on the basis of operation and functions which are realized by all the computer program instruction segments. Specific introductions of the operation and the functions which are realized by the determination module 01, the calculation module 02 and the control module 03 will be described below.

The determination module 01 is used for acquiring current positioning data (for example an indoor position, a posture and the like) of the robot in real time or regularly (for example every 2 seconds), and determining whether an obstacle, which is spaced from a current position at a distance shorter than a preset distance, exists in a path from the current position to a target position or not according to the current positioning data and position data of all obstacles in a predetermined moving region. For example, distances from all the obstacles in the predetermined moving region may be positioned and judged via an own sensor of the robot. For example, a proximity sensor (such as an ultrasonic sensor, an infrared sensor and a laser sensor) may be installed on the robot to judge whether the obstacle, which is spaced from the current position at the distance shorter than the preset distance, exists in the path from the current position of the robot to the target position or not.

The calculation module 02 is used for calculating the shortest distance between the robot and the obstacle according to the acquired positioning data, a predetermined 3D model of the robot and a predetermined 3D model of the obstacle if the obstacle, which is spaced from the current position at the distance shorter than the preset distance, exists.

After the distances between the current position of the robot and all the obstacles in the predetermined moving region are detected, but if no obstacle, which is spaced from the current position at the distance shorter than the preset distance, exists, the robot goes on moving along the path to the target position, and distances between the robot and all the obstacles in the moving region are detected in real time or regularly. If the obstacle, which is spaced from the current position at the distance shorter than the preset distance, exists, the shortest distance between the robot and the obstacle is calculated according to the acquired positioning data, the predetermined 3D model of the robot and the predetermined 3D model of the obstacle to judge whether the robot in a three-dimensional space may collide with the obstacle or not during moving along the path to the target position by using the shortest distance, thereby realizing that an obstacle may be detected at a height plane where the sensor of the robot is located, and a potential obstacle in the three-dimensional space may be also detected, that is, the potential obstacles in all directions in the three-dimensional space may be all detected in a direction where the sensor is installed on the robot and in other directions where no sensors are installed on the robot, wherein the predetermined 3D model of the robot and the 3D models of all the obstacles in the moving region may be pre-stored in a storage unit of the robot, or may be obtained by the robot which accesses an Internet of things system server through a wireless communication unit, and no limitation will be made here.

The control module 03 is used for calculating a due movement direction of the current robot according to the acquired positioning data, the calculated shortest distance and the 3D model of the obstacle, and controlling a movement posture of the robot according to the calculated movement direction to avoid the potential obstacles in all directions in the three-dimensional space, thus effectively controlling the robot to avoid the obstacles during moving along the path to the target position.

In this embodiment, when detection, carried out according to the current positioning data of the robot, finds that there is the obstacle spaced from the current position at the distance shorter than the preset distance, the shortest distance between the robot and the obstacle in the three-dimensional space is calculated according to the current positioning data of the robot, the predetermined 3D model of the robot and the predetermined 3D model of the obstacle, and the due movement direction of the current robot is also calculated, so that the movement posture of the robot may be controlled. The movement direction of the robot may be controlled via the shortest distance between the robot and the obstacle in the three-dimensional space, thus realizing detection and avoidance of obstacles in all directions of the robot in the three-dimensional space, and effectively controlling the robot to avoid the obstacles.

Further, the calculation module 02 is also used for:
preprocessing the predetermined 3D model of the robot and the 3D model of the obstacle, and calculating the shortest distance between the robot and the obstacle by using a predetermined distance calculation rule according to the acquired positioning data, preprocessed 3D model data of the robot and preprocessed 3D model data of the obstacle.

For example, as the robot and the obstacle are generally non-convex bodies, the 3D models of the robot and the obstacle may be preprocessed, for example they may be converted into convex bodies so as to calculate the shortest distance more accurately and quickly in the subsequent step.

Further, the calculation module 02 is also used for: for each joint of the robot, finding out a minimum convex polyhedron surrounding each joint by directly using a predetermined algorithm (for example a QuickHull algorithm) to convert the robot non-convex model into a convex model. By the 3D model of the robot subjected to convex processing, the calculation speed and the calculation precision may be effectively improved during subsequent calculation of a shortest distance vector.

There are three modes for preprocessing the 3D model of the obstacle: the first one is that a convex bounding box of a non-convex polyhedron is built, and then is converted into a convex body for collision detection; the second one is that the non-convex polyhedron is subjected to convex decomposition to convert the non-convex model into a plurality of convex bodies for collision detection; and the third one is that the 3D model of the obstacle is subjected to sector equal division (namely sector subdivision), and then single sectors subjected to the equal division are subjected to convex decomposition. The third mode of sector equal division first and then convex decomposition is higher in calculation speed and higher in calculation precision than the first two modes.

Further, the calculation module 02 is also used for:
building a spherical bounding box of the 3D model of the obstacle to be subjected to sector equal division, and finding out the sphere center of the spherical bounding box; setting an initial sector equal division plane passing through the sphere center, and rotating it for multiple times around the sphere center according to a preset rotating angle to equally divide the spherical bounding box into n sector portions, wherein the n sector portions of the spherical bounding box serve as n model portions of the 3D model of the obstacle.

For example, in one specific implementation modes, the operation may include the following steps:

X1, a spherical bounding box B of the 3D model M of the obstacle to be subjected to sector equal division is built, a sphere center O of the spherical bounding box B is found out, and a three-dimensional coordinate system Oxyz is built at the sphere center O;

X2, a straight line L, which is overlapped with the axis z in the three-dimensional coordinate system Oxyz, is made in a manner of passing through the sphere center O, so that the plane xoz is an initial sector equal division plane, and the plane xoz is set as $\alpha_1$ which divides the 3D model of the obstacle into 2 portions;

X3, $\alpha_1$ is rotated at a certain angle β (which represents an adjacent sector deflection angle) around the straight line L to obtain another new plane $\alpha_2$, the new plane is continuously rotated by β to obtain a plane $\alpha_3$, and when the plane is rotated by (m−1) times, an mth plane $\alpha_m$ may be obtained;

X4, supposing β=180/m, the m planes may equally divide the spherical bounding box B into 2 m portions, so that the 3D model of the obstacle is divided into 2 m model portions. By the above-mentioned steps, simple division of any model may be completed, including simple division of the non-convex model, and the divided model portions may be managed according to a hash table.

Further, the calculation module 02 is also used for:
carrying out surface triangulation on the 3D model of the obstacle by adopting a Delaunay triangulation algorithm to generate a triangular patch (lug) set, and constructing a convex block corresponding to each triangular patch for each triangular patch. For example, the triangular patches with zero thickness are stretched on the basis of a preset thickness in directions of their plane normal vectors, and then are changed into convex blocks.

Further, the predetermined distance calculation rule includes:
all the model portions obtained by the sector equal division of the 3D model of the obstacle are selected according to the current positioning data (such as the indoor position and the posture) of the robot and a predetermined selection algorithm to select a model portion to be subjected to distance calculation;

the shortest distance between the robot and the selected model portion is calculated by using a predetermined distance calculation algorithm (for example a GJK algorithm) according to the acquired positioning data and the selected model portion, wherein the shortest distance is the shortest distance between the robot and the 3D model of the obstacle.

Further, as shown in FIG. 2A and FIG. 2B, the predetermined selection algorithm includes:

Y1, the n model portions obtained by the sector equal division of the 3D model of the obstacle respectively serve as n nodes of the obstacle, and a hash table, in which key-values respectively correspond to rotating angles, namely the deflection angles, relative to the initial sector equal division plane (namely the plane xoz) and model geometrical information data, is built to carry out model node management;

Y2, all the model portions obtained by sector equal division are numbered, starting from 1; for the equally divided n sector model portions, an adjacent sector deflection angle is 360°/n; according to the numbers, a deflection angle mapping relation of a sector model portion at initial No. i is built; and a hash function representing the deflection angle mapping relation is:

$$\text{Hash}(i)=i*(360°/n)$$

where i represents the sector model portion No. i, and Hash(i) represents a deflection angle between the sector model portion No. i and the positive axis of axis X of an obstacle coordinate system;

Y3, kinematics of the robot is built, positions and postures of all the joints of the robot are calculated according to the built kinematics, and an obstacle sector region near to the robot is inquired in the built hash table. As shown in FIG. 2 below, during moving of the robot, according to the kinematics of the robot, the kinematical equation is as follows:

$$T_i = A_0 A_1 A_2 \ldots A_{i-1} A_i$$

where $A_k$ (k=1, 2, ..., i) is a homogeneous transformation matrix (which may be determined according to D-H parameters of all the joints of the robot) among joint coordinate systems of the robot, $A_0$ represents the current position matrix (which corresponds to the current positioning data of the robot) of the robot, and $T_i$ represents the position and the posture of the ith joint relative to a robot coordinate system;

real-time update values $Q_i$ (x, y, z) of origin coordinates of local coordinate systems of all the joints during moving of the robot are calculated according to $T_i$, and a deflection angle α of each joint under the obstacle coordinate system may be further obtained:

$$\alpha = f(Q_i(x, y, z))$$

where $Q_i$ (x, y, z) represents coordinates of each robot joint under the robot coordinate system; $T_r$ represents a transformation matrix (which is a 4*4 matrix, and if the robot coordinate system and the obstacle coordinate system have been confirmed, this matrix may be directly calculated) for transforming the robot coordinate system to the obstacle coordinate system, and coordinates $Q_i$ ($x_t$, $y_t$, $z_t$) of each robot joint under the obstacle coordinate system is as follows:

$$Q_i(x_t, y_t, z_t) = T_r Q_i(x, y, z)$$

supposing that the axis Z of the obstacle coordinate system is positively upward, the deflection angle of each joint under the obstacle coordinate system is set as α by abiding by a right-handed coordinate system, then $$\tan(\alpha) = \frac{y_t}{x_t}$$

this trigonometric function is solved to obtain the deflection angle of each joint under the obstacle coordinate system, which is α; after the deflection angle α is obtained, correspondingly numbered sector model portions may be calculated according to the hash function Hash(i) representing the deflection angle mapping relation, and model portions to be subjected to the distance calculation are selected on the basis of the correspondingly numbered sector model portions. For example, if the number of the calculated sector model section is k, sector model portions with numbers within a range of [k−M, k+N] may be selected for shortest distance calculation, wherein M and N are preset values; and the multiple sector model portions near to the selected sector model portion No. k serve as the model portions for shortest distance calculation.

As shown in FIG. 3A, in one specific implementation mode, the robot does not have arms and other movement joints, but only has a chassis movement; the 3D model of the robot is 1,500 mm in height and has a movement chassis radius of 320 mm, and the 3D model of the obstacle is a simple cubic model with the size of 2,200 mm*2,200 mm*1,000 mm; and under the obstacle model coordinate system, the current coordinates of the robot are (1800, −100).

During preprocessing of the obstacle model, the preprocessing is mainly to carry out sector equal division on the obstacle model; as shown in FIG. 3B, the obstacle model is subjected to the sector equal division into 32 portions, and the model portions obtained by the sector equal division are anticlockwise numbered as 1, 2, ..., 15, 16, ..., 31, 32 from the axis X; an included angle of each model block is 360/32=11.25 degrees. It can be seen that the model block No. 1 has a deflection angle of 11.25 degrees from the positive direction of the axis X, the model block No. 2 has a deflection angle of 11.25*2=22.5 degrees from the positive direction of the axis X, and the model block No. i has a deflection angle of i*(360/32) degrees from the positive direction of the axis X.

During selection of the model portions, as the robot adopted in this embodiment does not have the arms and other movement joints, but only has the chassis movement, a position and a posture of a chassis represent the overall position and posture of the robot; when the current position of the robot is at (1800, −100) (coordinates under the obstacle coordinate system), the deflection angle between the robot and the positive axis of the axis X of the obstacle coordinate system may be calculated as 354 degrees, and then the number of the sector model portion corresponding to the robot is calculated as 354/11.25=31.5 which is rounded up to an integer, thus obtaining 32, so that the number of the corresponding sector block to be subjected to distance calculation is 32, that is, the robot is closest to the obstacle block No. 32.

Next, by selection of the obstacle blocks near to K=32, the shortest distance between the obstacle block and the robot and shortest distance points are calculated by adopting GJK; if M=1, and N=2, the range from 31 to 34 for the obstacle blocks is obtained; those having the numbers larger than 32 need to be subjected to simple transformation: the obstacle block No. 33 is transformed into a corresponding obstacle block No. 1, and the obstacle block No. 34 is transformed into a corresponding obstacle block No. 2; and as shown in FIG. 3C, the obstacle blocks No. 31, 32, 1 and 2 are finally selected for shortest distance calculation.

During the calculation of the shortest distance, by virtue of the above processing, the range of the obstacle blocks has been narrowed as (1, 2, 31, 32), so that the shortest distance points between the robot and the obstacle may be directly calculated by adopting the GJK algorithm; as shown in FIG. 3D, and are respectively a point (x1, y1, z1)=(1100, −100, −235) on the obstacle, and a point (x2, y2, z2)=(1477, −100, −235) on the robot; and the shortest distance vector between the robot and the obstacle is $\vec{d}=(x2-x1, y2-y1, z2-z1)=(377,0,0)$.

Further, the control module 03 is also used for:

analyzing whether to avoid the obstacle or not according to the calculated shortest distance; if the calculated shortest distance is greater than a preset distance threshold value, determining that no obstacle avoidance is needed, or if the calculated shortest distance is less than or equal to the preset distance threshold value, determining that obstacle avoidance is needed; and if the obstacle avoidance is needed, calculating the due movement direction of the current robot according to the acquired positioning data, the calculated shortest distance and the 3D model of the obstacle, and controlling the movement posture of the robot according to the calculated movement direction.

Further, the control module 03 is also used for:

projecting the robot and the obstacle into the same coordinate system plane;

calculating an area of an effective blocking region of a projection of the obstacle relative to the current position of the robot and the target position according to a predetermined projection analysis rule and coordinates of all points on the outer contour of a projection region obtained by projecting the 3D model of the obstacle to the coordinate system plane;

determining a first preset type of obstacle avoidance parameter (such as virtual repulsive force) according to the calculated shortest distance and the area of the effective blocking region, determining a second preset type of obstacle avoidance parameter (such as virtual attractive force) according to a distance between the target point position and the current position of the robot, and determining the current due movement direction of the robot according to the first preset type of obstacle avoidance parameter and the second preset type of obstacle avoidance parameter.

Further, as shown in FIG. 4, the predetermined projection analysis rule is as follows:

a position point $P_1$ on the coordinate system plane is set to represent a position where the robot is located, namely the current position, a position point $P_2$ is set to represent a position where a target point is located, namely the target position, a projection region P3 represents a projection of the 3D model of the obstacle in the coordinate system plane, and $P_1$ and $P_2$ are connected in the coordinate system plane to obtain a straight line J;

if the straight line J and the projection region P3 do not have an intersection or only have one intersection, it determines that no effective blocking region exists;

if the straight line J and the projection region P3 have more than one intersection, the straight line J partitions the projection into two portions (a region $S_1$ and a region $S_2$ as shown in FIG. 4); any point $P_s$ is found in the projection region P3 (for example in the region $S_1$ or $S_2$), a perpendicular line of the straight line J is made in a manner of passing through $P_s$, and an intersection between the perpendicular line and the straight line J is $P_J$, thus obtaining a vector $\overrightarrow{P_JP_S}=P_J-P_S$; an included angle θ between the vector $\vec{d}$ of the shortest distance and the vector $\overrightarrow{P_JP_S}=P_J-P_S$ is calculated; if θ is an acute angle, it determines that the region where the point $P_s$ is located is the effective blocking region (for example, the effective blocking projection region $S_2$ in FIG. 4), or if θ is not an acute angle, it determines that the region where the point $P_s$ is located is not the effective blocking region.

Further, the first preset type of obstacle avoidance parameter is the virtual repulsive force, and the second preset type of obstacle avoidance parameter is the virtual attractive force. The control module 03 is also used for:

calculating one virtual repulsive force acting on the robot is calculated by using a first calculation rule according to the calculated shortest distance and the area of the effective blocking projection region;

calculating one virtual attractive force acting on the robot by using a second calculation rule according to the distance between the current position and the target point position;

calculating a resultant force direction of the virtual attractive force and the virtual repulsive force, wherein the resultant force direction is the current due movement direction of the robot.

Further, the first calculation rule is as follows:

$$\vec{F}_r f(\vec{d}, S)$$

where $\vec{d}$ is the vector of the shortest distance between the robot and the obstacle, S is the area of the effective blocking region, $\vec{F}_r$ is the virtual repulsive force from the obstacle to the robot, and $f(\vec{d}, S)$ represents a relational expression that the shortest distance vector and the area of the effective blocking region are converted into the virtual repulsive force from the obstacle to the robot. There are many ways for implementing the relational expression. In one optional embodiment, this relational expression is as follows:

$$F_r = f(d, s) = \begin{cases} 0 & d > d_0 \\ \dfrac{k_r}{d} + b_r & d \le d_0, s \le s_0 \\ \dfrac{k_r}{d} * \dfrac{s}{s_0} + b_r & d \le d_0, s > s_0 \end{cases}$$

where $k_r$ and $b_r$ represents preset virtual repulsive force coefficients, $s_0$ larger than 0 represents a preset area threshold value of the effective blocking region, and $d_0$ larger than 0 represents a preset distance threshold value; and the direction of the virtual repulsive force (namely the $\vec{F}_r$ direction) is the same as that of the shortest distance.

According to the relational expression, when the robot is farther to the obstacle, and the shortest distance is greater than the set distance threshold value $d_0$, no obstacle avoidance is needed, and $\vec{F}_r$ is 0; when the robot enters an obstacle avoidance distance range (namely the shortest distance is less than $d_0$), and the areas of the effective blocking region exceeds the set value $s_0$, $s/s_0$ is larger than 1, which would enlarge $\vec{F}_r$, so that the obstacle avoidance may be carried out at a farther distance, and the robot avoids the obstacle in advance to avoid relatively large obstacles.

Further, the second calculation rule is as follows:

$$F_t = k_t * d_t$$

where $\vec{F}_t$ is the virtual attractive force from the target position to the robot, $k_t$ represents a preset attractive force coefficient, $d_t$ represents a distance between the target position and the current position of the robot, and the direction of the virtual attractive force (namely the $\vec{F}_t$ direction) faces to the target position.

Further, a computer readable storage medium is further provided.

In this embodiment, the computer readable storage medium stores a system of controlling obstacle avoidance of a robot. The system of controlling obstacle avoidance of the robot may be executed by at least one processor to implement the following operations:

Step S10, current positioning data of the robot are acquired in real time or regularly, and whether an obstacle, which is spaced from a current position at a distance shorter than a preset distance, exists in a path from the current position to a target position or not is determined according to the current positioning data and position data of all obstacles in a predetermined moving region;

Step S20, if the obstacle, which is spaced from the current position at the distance shorter than the preset distance, exists, the shortest distance between the robot and the obstacle is calculated according to the acquired positioning data, a predetermined 3D model of the robot and a predetermined 3D model of the obstacle;

Step S30, a due movement direction of the current robot is calculated according to the acquired positioning data, the calculated shortest distance and the 3D model of the obstacle, and a movement posture of the robot is controlled according to the calculated movement direction to avoid the obstacle.

Further, the step S20 includes:

Step S201, the predetermined 3D model of the robot and the 3D model of the obstacle are preprocessed.

Step S202, the shortest distance between the robot and the obstacle is calculated by using a predetermined distance calculation rule according to the acquired positioning data, preprocessed 3D model data of the robot and preprocessed 3D model data of the obstacle.

Further, the preprocessing of the 3D model of the robot in the step S201 includes: for each joint of the robot, a minimum convex polyhedron surrounding each joint is found out by directly using a predetermined algorithm (for example a QuickHull algorithm) to convert the robot non-convex model into a convex model. By the 3D model of the robot subjected to convex processing, the calculation speed and the calculation precision may be effectively improved during subsequent calculation of a shortest distance vector.

There are three modes for preprocessing the 3D model of the obstacle: the first one is that a convex bounding box of a non-convex polyhedron is built, and then is converted into a convex body for collision detection; the second one is that the non-convex polyhedron is subjected to convex decomposition to convert the non-convex model into a plurality of convex bodies for collision detection; and the third one is that the 3D model of the obstacle is subjected to sector equal division (namely sector subdivision), and then single sectors subjected to the equal division are subjected to convex decomposition. The third mode of sector equal division first and then convex decomposition is higher in calculation speed and higher in calculation precision than the first two modes.

Further, the step that the 3D model of the obstacle is subjected to sector equal division includes:

a spherical bounding box of the 3D model of the obstacle to be subjected to sector equal division is built, and the sphere center of the spherical bounding box is found out;

an initial sector equal division plane passing through the sphere center is set, and then is rotated for multiple times around the sphere center according to a preset rotating angle to equally divide the spherical bounding box into n sector portions, wherein the n sector portions of the spherical bounding box serve as n model portions of the 3D model of the obstacle.

Further, the step that the single sectors subjected to equal division are subjected to convex decomposition includes:

the 3D model of the obstacle is subjected to surface triangulation by adopting a Delaunay triangulation algorithm to generate a triangular patch (lug) set, and a convex block corresponding to each triangular patch is constructed for each triangular patch. For example, the triangular patches with zero thickness are stretched on the basis of a preset thickness in directions of their plane normal vectors, and then are changed into convex blocks.

Further, the predetermined distance calculation rule includes:

all the model portions obtained by the sector equal division of the 3D model of the obstacle are selected according to the current positioning data (such as the indoor position and the posture) of the robot and a predetermined selection algorithm to select a model portion to be subjected to distance calculation;

the shortest distance between the robot and the selected model portion is calculated by using a predetermined distance calculation algorithm (for example a GJK algorithm) according to the acquired positioning data and the selected model portion, wherein the shortest distance is the shortest distance between the robot and the 3D model of the obstacle.

Further, the step S30 includes:

the system of controlling obstacle avoidance of the robot analyzes whether to avoid the obstacle or not according to the calculated shortest distance; if the calculated shortest distance is greater than a preset distance threshold value, the system determines that no obstacle avoidance is needed, or if the calculated shortest distance is less than or equal to the preset distance threshold value, the system determines that obstacle avoidance is needed. If the obstacle avoidance is needed, the system of controlling obstacle avoidance of the robot calculates the due movement direction of the current robot according to the acquired positioning data, the calculated shortest distance and the 3D model of the obstacle, and controls the movement posture of the robot according to the calculated movement direction.

Further, the step that the system calculates the due movement direction of the current robot according to the acquired positioning data, the calculated shortest distance and the 3D model of the obstacle includes:

the robot and the obstacle are projected into the same coordinate system plane;

an area of an effective blocking region of a projection of the obstacle relative to the current position of the robot and the target position is calculated according to a predetermined projection analysis rule and coordinates of all points on the outer contour of a projection region obtained by projecting the 3D model of the obstacle to the coordinate system plane;

a first preset type of obstacle avoidance parameter (such as virtual repulsive force) is determined according to the calculated shortest distance and the area of the effective blocking region, a second preset type of obstacle avoidance parameter (such as virtual attractive force) is determined according to a distance between the target point position and the current position of the robot, and the current due movement direction of the robot is determined according to the first preset type of obstacle avoidance parameter and the second preset type of obstacle avoidance parameter.

Further, the predetermined projection analysis rule is as follows:

a position point $P_1$ on the coordinate system plane is set to represent a position where the robot is located, namely the current position, a position point $P_2$ is set to represent a position where a target point is located, namely the target position, a projection region P3 represents a projection of the 3D model of the obstacle in the coordinate system plane, and $P_1$ and $P_2$ are connected in the coordinate system plane to obtain a straight line J;

if the straight line J and the projection region P3 do not have an intersection or only have one intersection, it determines that no effective blocking region exists;

if the straight line J and the projection region P3 have more than one intersection, the straight line J partitions the projection into two portions (a region $S_1$ and a region $S_2$ as shown in FIG. 4); any point $P_s$ is found in the projection region P3 (for example in the region $S_1$ or $S_2$), a perpendicular line of the straight line J is made in a manner of passing through $P_s$, and an intersection between the perpendicular line and the straight line J is $P_J$, thus obtaining a vector $\overrightarrow{P_J P_S} = P_J - P_S$; an included angle θ between the vector $\vec{d}$ of the shortest distance and the vector $\overrightarrow{P_J P_S} = P_J - P_S$ is calculated; if θ is an acute angle, it determines that the region where the point $P_s$ is located is the effective blocking region (for example, the effective blocking projection region $S_2$ in FIG. 4), or if θ is not an acute angle, it determines that the region where the point $P_s$ is located is not the effective blocking region.

Further, the first preset type of obstacle avoidance parameter is the virtual repulsive force, and the second preset type of obstacle avoidance parameter is the virtual attractive force. The step that the first preset type of obstacle avoidance parameter is determined according to the calculated shortest distance and the area of the effective blocking region, the second preset type of obstacle avoidance parameter is determined according to the distance between the target position and the current position of the robot, and the current due movement direction of the robot is determined according to the first preset type of obstacle avoidance parameter and the second preset type of obstacle avoidance parameter includes:

one virtual repulsive force acting on the robot is calculated by using a first calculation rule according to the calculated shortest distance and the area of the effective blocking projection region;

one virtual attractive force acting on the robot is calculated by using a second calculation rule according to the distance between the current position and the target point position;

a resultant force direction of the virtual attractive force and the virtual repulsive force is calculated, wherein the resultant force direction is the current due movement direction of the robot.

Further, the first calculation rule is as follows:

$$\vec{F}_r = f(\vec{d}, S)$$

where $\vec{d}$ is the vector of the shortest distance between the robot and the obstacle, S is the area of the effective blocking region, $\vec{F}_r$ is the virtual repulsive force from the obstacle to the robot, and $f(\vec{d}, S)$ represents a relational expression that the shortest distance vector and the area of the effective blocking region are converted into the virtual repulsive force from the obstacle to the robot. There are many ways for implementing the relational expression. In one optional embodiment, this relational expression is as follows:

$$F_r = f(d, s) = \begin{cases} 0 & d > d_0 \\ \dfrac{k_r}{d} + b_r & d \le d_0, s \le s_0 \\ \dfrac{k_r}{d} * \dfrac{s}{s_0} + b_r & d \le d_0, s > s_0 \end{cases}$$

where $k_r$ and $b_r$ represents preset virtual repulsive force coefficients, $s_0$ larger than 0 represents a preset area threshold value of the effective blocking region, and $d_0$ larger than 0 represents a preset distance threshold value; and the direction of the virtual repulsive force (namely the $\vec{F}_r$ direction) is the same as that of the shortest distance.

According to the relational expression, when the robot is farther to the obstacle, and the shortest distance is greater than the set distance threshold value $d_0$, no obstacle avoidance is needed, and $\vec{F}_r$ is 0; when the robot enters an obstacle avoidance distance range (namely the shortest distance is less than $d_0$), and the areas of the effective blocking region exceeds the set value $s_0$, $s/s_0$ is larger than 1, which would enlarge $\vec{F}_r$, so that the obstacle avoidance may be carried out at a farther distance, and the robot avoids the obstacle in advance to avoid relatively large obstacles.

Further, the second calculation rule is as follows:

$$F_t = k_t * d_t$$

where $\vec{F}_t$ is the virtual attractive force from the target position to the robot, $k_t$ represents a preset attractive force coefficient, $d_t$ represents a distance between the target position and the current position of the robot, and the direction of the virtual attractive force (namely the $\vec{F}_t$ direction) faces to the target position.

The specific implementation modes of the computer readable storage medium of the disclosure are substantially the same as the above-mentioned embodiments of the method of obstacle avoidance of the robot, so that no more details will be described here.

It should be noted that in this text, terms "include" and "comprise" or any other variations aim at covering non-excludable including, so that processes, methods, objects or devices including a series of elements not only include those elements, but also include other elements which are not definitely listed, or also include fixed elements of these processes, methods, objects or devices. In the absence of more restrictions, an element defined by a sentence "including a . . . " does not exclude that the processes, methods, objects or devices including this element still include other same elements.

By the description of the foregoing implementation modes, it will be evident to those skilled in the art that the methods according to the above embodiments may be implemented by means of software plus a necessary general-purpose hardware platform; they may of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., an ROM/RAM, a magnetic disk, an optical disc) and may include a plurality of instructions that, when executed, can cause a set of terminal equipment (e.g., a mobile phone, a computer, a server, a conditioner, network equipment), to execute the methods described in the various embodiments of the disclosure.

The foregoing accompanying drawings describe exemplary embodiments and therefore are not intended as limiting the patentable scope of the disclosure. The foregoing numbering of the embodiments of the disclosure is merely descriptive, but is not indicative of the pros and cons of these embodiments. In addition, although a logic sequence is shown in the flowchart, the steps shown or described may be executed in a sequence different from this logic sequence in some cases.

Those skilled in the art can make various transformation solutions to implement the disclosure without departing from the scope and essence of the disclosure, for example, features of one embodiment may be used in another embodiment to obtain another embodiment. Any modifications, equivalent replacements and improvements that are made taking advantage of the technical conception of the disclosure shall all fall in the patentable scope of the disclosure.

What is claimed is:

1. A system of controlling obstacle avoidance of a robot, comprising:
    acquiring, by a determination module, a current positioning data of the robot in real time or regularly;
    determining, by the determination module according to the current positioning data and position data of all obstacles in a predetermined moving region, whether an obstacle spaced from a current position at a distance shorter than a preset distance, exists in a path from the current position to a target position or not wherein the obstacle is an obstacle of all the obstacles;
    if the obstacle is spaced from the current position at the distance shorter than the preset distance, calculating, by a calculation module, a shortest distance between the robot and the obstacle according to the current positioning data, a predetermined 3D model of the robot and a predetermined 3D model of the obstacle;
    calculating, by a control module, a due movement direction of the robot according to the current positioning data, the shortest distance and the 3D model of the obstacle; and
    controlling, by the control module, a movement posture of the robot according to the due movement direction to avoid the obstacle.

2. The system of controlling obstacle avoidance of the robot of claim 1, wherein the calculation module is further configured to:
    preprocess the predetermined 3D model of the robot and the predetermined 3D model of the obstacle, and for each joint of the robot, determine a minimum convex polyhedron surrounding each joint by using a predetermined algorithm to convert a robot non-convex model into a convex model; carry out a sector equal division on the predetermined 3D model of the obstacle, and then carry out convex decomposition on single sectors subjected to the sector equal division; and
    calculate the shortest distance between the robot and the obstacle by using a predetermined distance calculation rule according to the current positioning data, a preprocessed 3D model data of the robot and a preprocessed 3D model data of the obstacle.

3. The system of controlling obstacle avoidance of the robot of claim 2, wherein the calculation module is configured to:
    build a spherical bounding box of the 3D module of the obstacle to be subjected to the sector equal division, and find out a sphere center of the spherical bounding box;
    set an initial sector equal division plane passing through the sphere center, and rotates the plane for multiple times around the sphere center according to a preset rotating angle to equally divide the spherical bounding box into a plurality of sector portions, wherein the plurality of sector portions of the spherical bounding box serve as a plurality of model portions of the 3D model of the obstacle.

4. The system of controlling obstacle avoidance of the robot of claim 2, wherein the predetermined distance calculation rule comprises:
    selecting all model portions obtained by the sector equal division of the 3D model of the obstacle according to the current positioning data of the robot and a predetermined selection algorithm to select a model portion to be subjected to distance calculation;
    calculating the shortest distance between the robot and the selected model portion using a predetermined distance calculation algorithm according to the current positioning data and the selected model portion, wherein the shortest distance is the shortest distance between the robot and the obstacle;
    and wherein the predetermined selection algorithm comprises:
    by respectively taking the plurality of model portions of the 3D model of the obstacle as n nodes of the obstacle, and building a hash table, in the hash table key-values respectively correspond to deflection angles of an initial sector equal division plane to carry out model node management;
    numbering all the model portions, and according to the numbers, building a deflection angle mapping relation of a sector model portion number i, wherein a hash function representing the deflection angle mapping relation is defined as $$\text{Hash}(i) = i*(360°/n)$$

where Hash(i) represents a deflection angle between the sector model portion number i and a positive x axis of an obstacle coordinate system, wherein n is a total number of model positions;
    building a kinematical equation of the robot, and calculating positions and postures of all joints of the robot according to the kinematical equation, wherein the kinematical equation is $$T_i = A_0 A_1 A_2 \ldots A_{i-1} A_i$$

where $A_k$ (k=1, 2, ... , i) is a homogeneous transformation matrix among joint coordinate systems of the robot, $A_0$ represents a current position matrix of the robot, and $T_i$ represents a position and posture of the ith joint relative to a robot coordinate system;
    calculating coordinates $Q_i$ (x, y, z) of all the joints under the robot coordinate system during movement of the robot according to $T_i$, and calculating a transformation matrix $T_r$ for transforming the robot coordinate system to the obstacle coordinate system, wherein coordinates $Q_i$ $(x_t, y_t, z_t)$ of each robot joint under the obstacle coordinate system are $$Q_i(x_t, y_t, z_t) = T_r Q_i(x, y, z)$$

a deflection angle α of the each joint under the obstacle coordinate system is obtained through a following formula $$\tan(\alpha) = \frac{y_t}{x_t},$$

and corresponding numbered model portions are calculated according to the deflection angle α and the hash function Hash(i), and the model portions to be subjected to the distance calculation are selected on the basis of a correspondingly numbered model portions.

5. The system of controlling obstacle avoidance of the robot of claim 1, wherein the control module is configured for:
  projecting the 3D models of the robot and the obstacle into a same coordinate system plane;
  calculating an area of an effective blocking region of a projection of the 3D model of the obstacle relative to the current position of the robot and the target position according to a predetermined projection analysis rule and coordinates of all points on an outer contour of a projection region obtained by projecting the 3D model of the obstacle to the coordinate system plane;
  determining a first preset type of obstacle avoidance parameter according to the shortest distance and an area of the effective blocking region, determining a second preset type of obstacle avoidance parameter according to a distance between the target position and the current position of the robot, and determining a current due movement direction of the robot according to the first preset type of obstacle avoidance parameter and the second preset type of obstacle avoidance parameter.

6. The system of controlling obstacle avoidance of the robot of claim 5, wherein the predetermined projection analysis rule is as follows:
  setting a position point $P_1$ on the coordinate system plane to represent the current position of the robot, wherein a position point $P_2$ is the target position, a projection region P3 is a projection of the 3D model of the obstacle in the coordinate system plane, and $P_1$ and $P_2$ are connected in the coordinate system plane to obtain a straight line J;
  if the straight line J and the projection region P3 do not have an intersection or only have one intersection, determining that no effective blocking region exists;
  if the straight line J and the projection region P3 have more than one intersection, partitioning the projection into two portions by the straight line J; finding any point $P_s$ in the projection region P3, making a perpendicular line of the straight line J in a manner of passing through $P_s$, and setting an intersection between the perpendicular line and the straight line J as $P_J$, thus obtaining a vector $\overrightarrow{P_J P_S}$; calculating an included angle θ between the vector $\vec{d}$ of the shortest distance and the vector $\overrightarrow{P_J P_S}$; if the included angle θ is an acute angle, determining that the region where the point $P_s$ is located is the effective blocking region, or if the included angle θ is not an acute angle, determining that the region where the point $P_s$ is located is not the effective blocking region.

7. The system of controlling obstacle avoidance of the robot of claim 5, wherein the first preset type of obstacle avoidance parameter is a virtual repulsive force, and the second preset type of obstacle avoidance parameter is a virtual attractive force; and the control module is configured for:
  calculating the virtual repulsive force acting on the robot by using a first calculation rule according to the calculated shortest distance and the area of the effective blocking region;
  calculating the virtual attractive force acting on the robot by using a second calculation rule according to the distance between the current position and the target point position;
  calculating a resultant force direction of the virtual attractive force and the virtual repulsive force, which serves as the current due movement direction of the robot.

8. The system of controlling obstacle avoidance of the robot of claim 7, wherein the first calculation rule is as follows:
  setting the vector of the shortest distance between the robot and the obstacle as $\vec{d}$, setting the area of the effective blocking region as S, and setting the virtual repulsive force from the obstacle to the robot as $\vec{F}_r$, wherein $$F_r = f(d, s) = \begin{cases} 0 & d > d_0 \\ \frac{k_r}{d} + b_r & d \leq d_0, s \leq s_0 \\ \frac{k_r}{d} * \frac{s}{s_0} + b_r & d \leq d_0, s > s_0 \end{cases}$$

where $\vec{d}$ is the vector of the shortest distance between the robot and the obstacle, S is the area of the effective blocking region, $\vec{F}_r$ is the virtual repulsive force from the obstacle to the robot, $k_r$ and $b_r$ represent preset virtual repulsive force coefficients, $s_0$ represents a preset area threshold value of the effective blocking region, and $d_0$ represents a preset distance threshold value; and the direction of $\vec{F}_r$ is the same as that of the shortest distance.

9. The system of controlling obstacle avoidance of the robot of claim 7, wherein the second calculation rule is as follows:

$$F_t = k_t * d_t$$

where $\vec{F}_t$ is the virtual attractive force from the target position to the robot, $k_t$ represents a preset attractive force coefficient, $d_t$ represents a distance between the target position and the current position of the robot, and the direction of the $\vec{F}_t$ is towards the target position.

10. A method of obstacle avoidance of a robot, comprising:
  A1, acquiring a current positioning data of the robot in real time or regularly, and determining whether an obstacle spaced from a current position at a distance shorter than a preset distance, exists in a path from the current position to a target position or not according to the current positioning data and position data of all obstacles in a predetermined moving region;

A2, if the obstacle, spaced from the current position at the distance shorter than the preset distance, calculating a shortest distance between the robot and the obstacle according to the current positioning data, a predetermined 3D model of the robot and a predetermined 3D model of the obstacle;

A3, calculating a due movement direction of the current robot according to the current positioning data, the calculated shortest distance and the 3D model of the obstacle, and controlling a movement posture of the robot according to the due movement direction to avoid the obstacles.

11. The method of obstacle avoidance of the robot of claim 10, wherein the step A2 comprises:

preprocessing the predetermined 3D model of the robot and the predetermined 3D model of the obstacle, and for each joint of the robot, determining a minimum convex polyhedron surrounding each joint by directly using a predetermined algorithm to convert the robot non-convex model into a convex model;

carrying out a sector equal division on the predetermined 3D model of the obstacle, and then carrying out a convex decomposition on single sectors subjected to the sector equal division;

calculating the shortest distance between the robot and the obstacle by using a predetermined distance calculation rule according to the current positioning data, a preprocessed 3D model data of the robot and a preprocessed 3D model data of the obstacle.

12. The method of obstacle avoidance of the robot of claim 11, wherein the step A2 further comprises:

building a spherical bounding box of the 3D model of the obstacle to be subjected to the sector equal division, and finding out a sphere center of the spherical bounding box;

setting an initial sector equal division plane passing through the sphere center, and rotating the plane for multiple times around the sphere center according to a preset rotating angle to equally divide the spherical bounding box into a plurality of sector portions, wherein the plurality of sector portions of the spherical bounding box serve as a plurality of model portions of the 3D model of the obstacle.

13. The method of obstacle avoidance of the robot of claim 11, wherein the predetermined distance calculation rule comprises:

selecting all model portions obtained by the sector equal division of the 3D model of the obstacle according to the current positioning data of the robot and a predetermined selection algorithm to select a model portion to be subjected to distance calculation;

calculating the shortest distance between the robot and the selected model portion by using a predetermined distance calculation algorithm according to the current positioning data and the selected model portion, wherein the shortest distance is the shortest distance between the robot and the obstacle;

and wherein the predetermined selection algorithm comprises:

by respectively taking the plurality of model portions obtained by the sector equal division of the 3D model of the obstacle as a plurality of nodes of the obstacle, and building a hash table, in the hash table key-values respectively correspond to deflection angles of an initial sector equal division plane to carry out model node management;

numbering all the model portions, and according to the numbers, building a deflection angle mapping relation of a sector model portion number i, wherein a hash function representing the deflection angle mapping relation is defined as $$\text{Hash}(i) = i*(360°/n)$$

where Hash(i) represents a deflection angle between the sector model portion number i and a positive x axis of an obstacle coordinate system, wherein n is a total number of model positions;

building a kinematical equation of the robot, and calculating positions and postures of all joints of the robot according to the kinematical equation, wherein the kinematical equation is $$T_i = A_0 A_1 A_2 \ldots A_{i-1} A_i$$

where $A_k$ (k=1, 2, ..., i) is a homogeneous transformation matrix among joint coordinate systems of the robot, $A_0$ represents a current position matrix of the robot, and $T_i$ represents a position and posture of the ith joint relative to a robot coordinate system;

calculating coordinates $Q_i$ (x, y, z) of all the joints under the robot coordinate system during moving of the robot according to $T_i$, and calculating a transformation matrix $T_r$ for transforming the robot coordinate system to the obstacle coordinate system, wherein coordinates $Q_i$ ($x_t, y_t, z_t$) of each robot joint under the obstacle coordinate system are $$Q_i(x_t, y_t, z_t) = T_r Q_i(x, y, z)$$

a deflection angle α of each joint under the obstacle coordinate system is obtained through a following formula $$\tan(\alpha) = \frac{y_t}{x_t},$$

and corresponding numbered model portions are calculated according to the deflection angle α and the hash function Hash(i), and the model portions to be subjected to the distance calculation are selected on the basis of a correspondingly numbered model portions.

14. The method of obstacle avoidance of the robot of claim 10, wherein the step A3 comprises:

projecting the 3D models of the robot and the obstacle into a same coordinate system plane;

calculating an area of an effective blocking region of a projection of the 3D model of the obstacle relative to the current position of the robot and the target position according to a predetermined projection analysis rule and coordinates of all points on an outer contour of a projection region obtained by projecting the 3D model of the obstacle to the coordinate system plane;

determining a first preset type of obstacle avoidance parameter according to the shortest distance and an area of the effective blocking region, determining a second preset type of obstacle avoidance parameter according to a distance between the target position and the current position of the robot, and determining a current due movement direction of the robot according to the first preset type of obstacle avoidance parameter and the second preset type of obstacle avoidance parameter.

15. The method of obstacle avoidance of the robot of claim 14, wherein the predetermined projection analysis rule is as follows:

setting a position point $P_1$ on the coordinate system plane to represent the current position of the robot, wherein a position point $P_2$ is the target position, a projection region P3 is a projection of the 3D model of the obstacle in the coordinate system plane, and $P_1$ and $P_2$ are connected in the coordinate system plane to obtain a straight line J;

if the straight line J and the projection region P3 do not have an intersection or only have one intersection, determining that no effective blocking region exists;

if the straight line J and the projection region P3 have more than one intersection, partitioning the projection into two portions by the straight line J; finding any point $P_s$ in the projection region P3, making a perpendicular line of the straight line J in a manner of passing through $P_s$, and setting an intersection between the perpendicular line and the straight line J as $P_j$, thus obtaining a vector $\overrightarrow{P_j P_s}$; calculating an included angle θ between the vector $\vec{d}$ of the shortest distance and the vector $\overrightarrow{P_j P_s}$; if the included angle θ is an acute angle, determining that the region where the point $P_s$ is located is the effective blocking region, or if the included angle θ is not an acute angle, determining that the region where the point $P_s$ is located is not the effective blocking region.

16. The method of obstacle avoidance of the robot of claim 14, wherein the first preset type of obstacle avoidance parameter is a virtual repulsive force, and the second preset type of obstacle avoidance parameter is a virtual attractive force; and the step A3 further comprises:

calculating the virtual repulsive force acting on the robot by using a first calculation rule according to the calculated shortest distance and the area of the effective blocking region;

calculating the virtual attractive force acting on the robot by using a second calculation rule according to the distance between the current position and the target point position;

calculating a resultant force direction of the virtual attractive force and the virtual repulsive force, which serves as the current due movement direction of the robot.

17. The method of obstacle avoidance of the robot of claim 16, wherein the first calculation rule is as follows:

setting the vector of the shortest distance between the robot and the obstacle as $\vec{d}$, setting the area of the effective blocking region as S, and setting the virtual repulsive force from the obstacle to the robot as $\vec{F}_r$, wherein $$F_r = f(d, s) = \begin{cases} 0 & d > d_0 \\ \dfrac{k_r}{d} + b_r & d \leq d_0, s \leq s_0 \\ \dfrac{k_r}{d} * \dfrac{s}{s_0} + b_r & d \leq d_0, s > s_0 \end{cases}$$

where $\vec{d}$ is the vector of the shortest distance between the robot and the obstacle, S is the area of the effective blocking region, $\vec{F}_r$ is the virtual repulsive force from the obstacle to the robot, $k_r$ and $b_r$ represents preset virtual repulsive force coefficients, $s_0$ represents a preset area threshold value of the effective blocking region, and $d_0$ represents a preset distance threshold value; and the direction of $\vec{F}_r$ is the same as that of the shortest distance.

18. The method of obstacle avoidance of the robot of claim 16, wherein the second calculation rule is as follows:

$F_t = k_t * d_t$ where $\vec{F}^t$ is the virtual attractive force from the target position to the robot, $k_t$ represents a preset attractive force coefficient, $d_t$ represents a distance between the target position and the current position of the robot, and the direction of $\vec{F}^t$ is towards the target position.

19. A robot, comprising a processor and a memory, wherein the memory stores a system of controlling obstacle avoidance of the robot, and the system of controlling obstacle avoidance of the robot may be executed by the processor to implement following steps:

A1, acquiring a current positioning data of the robot in real time or regularly, and determining whether an obstacle spaced from a current position at a distance shorter than a preset distance, exists in a path from the current position to a target position or not according to the current positioning data and position data of all obstacles in a predetermined moving region;

A2, if the obstacle, spaced from the current position at the distance shorter than the preset distance, calculating a shortest distance between the robot and the obstacle according to the current positioning data, a predetermined 3D model of the robot and a predetermined 3D model of the obstacle;

A3, calculating a due movement direction of the current robot according to the current positioning data, the calculated shortest distance and the 3D model of the obstacle, and controlling a movement posture of the robot according to the due movement direction to avoid the obstacles.

* * * * *